United States Patent [19]

Suppes

[11] Patent Number: 5,398,497
[45] Date of Patent: Mar. 21, 1995

[54] METHOD USING GAS-GAS HEAT EXCHANGE WITH AN INTERMEDIATE DIRECT CONTACT HEAT EXCHANGE FLUID

[76] Inventor: Galen J. Suppes, 217 Summertree, Lawrence, Kans. 66049

[21] Appl. No.: 57,874

[22] Filed: May 7, 1993

Related U.S. Application Data

[63] Continuation-in-part of Ser. No. 801,473, Dec. 2, 1991, abandoned.

[51] Int. Cl.⁶ .............................................. F02C 3/30
[52] U.S. Cl. ................................ 60/39.05; 60/39.511; 60/39.53
[58] Field of Search .............. 60/39.02, 39.05, 39.511, 60/39.53, 39.57

[56] References Cited

U.S. PATENT DOCUMENTS

| | | | |
|---|---|---|---|
| 2,186,706 | 1/1940 | Martinka | 60/39.511 |
| 2,781,635 | 2/1957 | Brogdon | 60/39.05 |
| 4,448,018 | 5/1984 | Sayama et al. | 60/39.53 |
| 4,537,023 | 8/1985 | Nakamura | 60/39.53 |
| 4,733,528 | 3/1988 | Pinto | 60/39.02 |

Primary Examiner—Louis J. Casaregola

[57] ABSTRACT

A method for burning slurry, liquid, or gaseous fuels at elevated pressures allows lower quality fuels to yield more energy and higher quality energy due to increased dew point temperatures in flue gases and high temperature heat exchange. The combination of elevated pressures and oxygen rich oxidant allows increased waste heat recovery, higher quality heat recovery, and substantially reduced air pollution. Turbochargers operated by flue gas and pressurized air, force the oxygen into the combustion chamber at increased pressures. Oxygen permeable membranes lower levels of nitrogen and reduce pollution by enhancing the stripping of pollutants from the flue gas and by the absolute reduction of flue gas exhaust. Latent heat recovery and water dilution of combustion mixtures are important aspects of the embodiments of this invention; both are enhanced by the vaporization of influent liquids while contacting influent gasses. High temperature heat exchange is facilitated by direct contact heat exchange means. Substantially reduced pollution levels allow operation in residential and downtown areas where cogenerated heat and coolant can be utilized. This method is particularly useful for converting garbage or sewage into electricity and for increased biomass combustion efficiency; however, advantages of this method can also be realized for most conventional fuels.

8 Claims, 3 Drawing Sheets

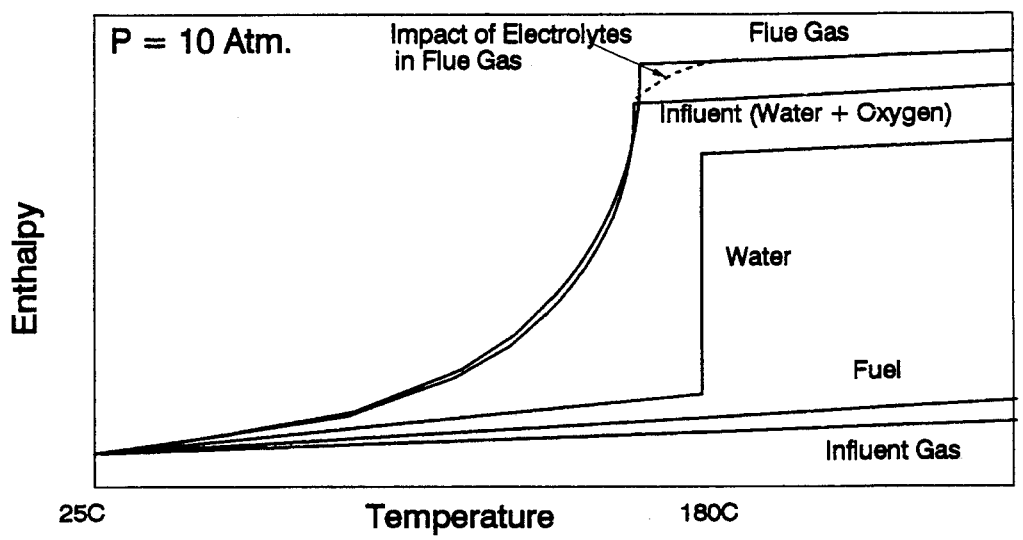
FIG. 2
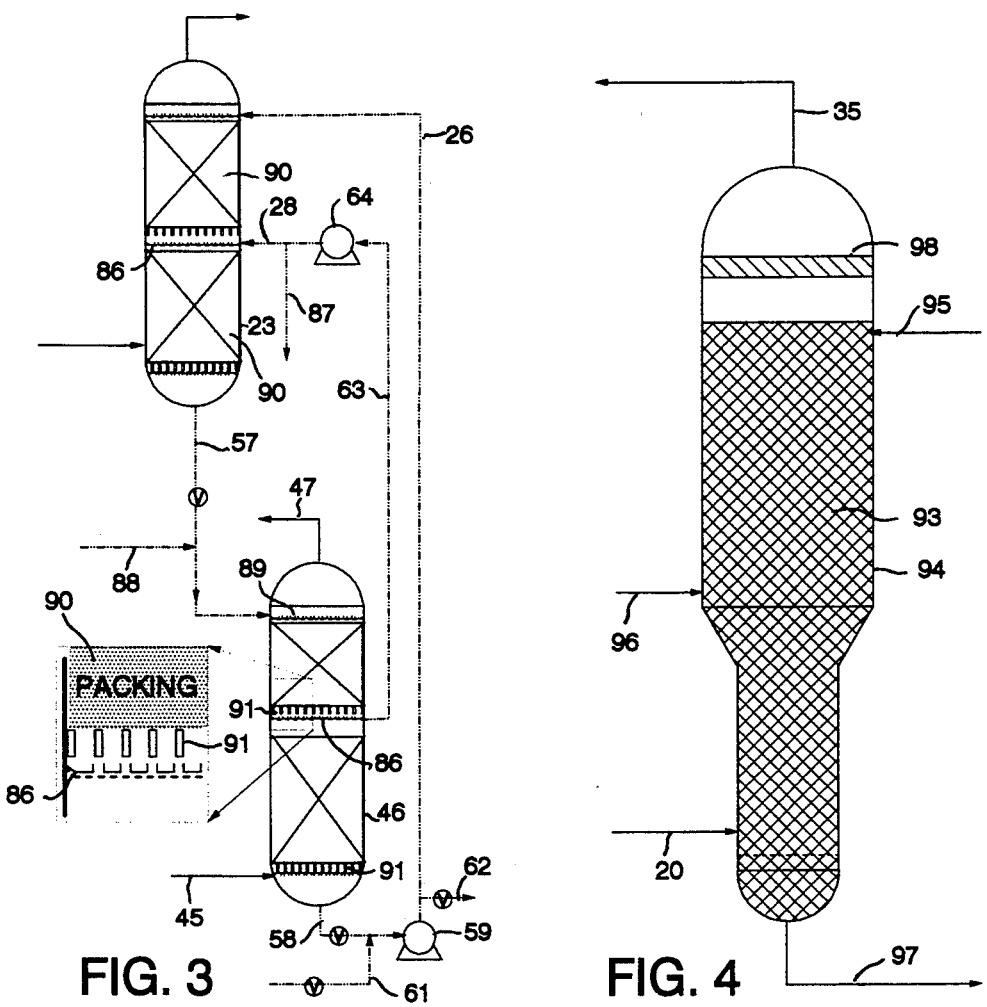
FIG. 3
FIG. 4

METHOD USING GAS-GAS HEAT EXCHANGE WITH AN INTERMEDIATE DIRECT CONTACT HEAT EXCHANGE FLUID

CROSS REFERENCE TO RELATED APPLICATION

This application is a continuation-in-part of Ser. No. 07/801,473, Filed Dec. 2, 1991, now abandoned.

BACKGROUND OF THE INVENTION

1. FIELD OF THE INVENTION

The present invention relates generally to a method for reducing pollution and increasing waste heat recovery in power generation systems and combustion methods, and for an arrangement of apparatus for carrying out the method. More particularly, the present invention relates to both reduced pollution and increased energy recovery from the flue gas by operating with flue gas recirculation at increased pressures, with direct contact heat exchange, and with higher oxygen concentrations in influents. An embodiment of this invention includes a regenerative Brayton cycle using a slurry fuel. This invention has useful applications in combustion of biomass, coal slurries, sewage, and garbage as well as other energy conversion methods such as air conditioning.

2. BRIEF REVIEW OF PRIOR ART

Historically, the energy of water vapors in flue gases has been regarded as not recoverable in a form of sufficiently high quality to warrant development of methods based around this concept.

U.S. patent 4,898,107 recognizes the benefits of burning liquid or solid wastes at increased pressures to recover more latent heat from the water vapor in the flue gas. However, U.S. Pat. No. 4,898,207 is based on configurations operating at relatively low temperatures and relying on alkali addition to the combustion method as a primary means of pollution control.

U.S. Pat. Nos. 4,714,032, 4,377,066, and 4,380,960 refer to combustion at high pressure conditions and in the presence of excess water. These patents are very specific with respect to addition of alkali to the combustion feed or the nature of the fuels. The embodiments of this invention can improve the performance of these patents as well as U.S. Pat. No. 4,898,107. However, the embodiments of this invention are not limited to the embodiments of said patents.

Furthermore, U.S. Pat. No. 2,677,234 is based on the pressurized combustion of water containing fuels; however, methods of the present invention are more advanced in conserving energy (the availability of energy to be convened into work). U.S. Pat. No. 5,067,317 is based on the pressurized combustion of slurry fuels and condenses water in the flue gas to be used in creating the slurry fuels. The present invention recirculates water in a different manner than these patents with specific advantages associated with allowing lower quality (lower temperature) heat to be used to evaporate water contacting influent gases.

U.S. Pat. No. 3,328,957 describes an underwater propulsion system in which water can be recycled in the system. The present invention recirculates water in a different manner with specific advantages associated with allowing lower quality (lower temperature) heat to evaporate water in influents.

U.S. Pat. No. 4,238,925 describes a combustion method in which liquid oxygen is used as an oxidant for the combustion of fuel and utilizes flue gas recirculation and heat exchange from flue gas to influents prior to combustion. Methods and associated advantages described in U.S. Pat. No. 4,238,925 are not similar to those claimed by the present invention.

U.S. Pat. No. 5,069,692 describes a system utilizing an air separation means to provide for on board (aircraft) generation of inert gas and oxygen which is available to the crew and for combustion. U.S. Pat. No. 5,069,692 discloses methods for air separation with membranes; however, the combustion methods are not similar to those of the present invention.

U.S. Pat. No. 4,909,029 describes fluidized bed firing equipment at a pressurized environment and operating under a turbocharge. The embodiments of the present invention are not similar to the mechanical configurations of the said patent.

U.S. Pat. No. 4,829,938 describes a novel method on how to operate a denitrification unit. The present invention is not specific to configurations of heat exchangers, economizers, and denitrification units. Such configurations as described in U.S. Pat. No. 4,829,938 can be directly applied to the present invention based on the quality of heat available at specific locations.

U.S. Pat. 4,799,941 is based on increasing the production of low grade heat by humidifying entering oxidants and then extracting the latent heat from resulting flue gasses. The author points out that this method is particularly advantageous when burning wood chips or other organic matter. The present invention produces higher grade heat by a different method based on water condensation under pressure.

U.S. Pat. No. 4,542,621 refers to a method of scrubbing sulfur containing flue gases. This method relies on mixing previously scrubbed and heated flue gases with more recently scrubbed flue gases to prevent misting from occurring when the flue gases are released to the environment. The present invention is enhanced over this patent in that the total volume of gases released is substantially reduced and reheating the flue gas is not necessary, especially if a demister is used in the exhaust stack.

U.S. Pat. No. 4,414,923 describes a heat recovery boiler for high pressure gas. Although such embodiments may be useful with the present invention, the said embodiment is not necessary for the successful operation of this invention.

Oxygen enriching embodiments are described in U.S. Pat. Nos. 4,894,068, 4,696,686, 4,599,157, and 4,542,010; however, none of these embodiments are associated with combustion methods. U.S. Pat. No. 4,883,023 describes a turbocharger mechanism operatively associated with oxygen enriching mechanisms; however, the methods, embodiments, and purpose of U.S. Pat. No. 4,883,023 are not similar to those of the present invention.

Some of the novelty of the present invention resides on the method of direct contact heat exchange. Whereas conventional closed heat exchangers rely on a solid wall to transfer heat between two streams, direct contact heat exchange occurs between two streams in direct contact. Demonstrated systems include water-air in cooling towers, clinker-air in cement kilns, vapor-liquid in distillation columns, and molten nitrate salt-air in a solar flux receiver (see *Direct-Contact Heat Transfer* by Frank Kreith and R. F. Boehm). For most of these applications, direct contact heat exchange has become very popular. In fact, cited advantages of direct contact heat exchange include reduced capital costs, eliminated fouling of solid heat exchange surfaces, eliminated thermal stress and corrosion problems, increased heat transfer coefficients, and readily increased surface areas for heat transfer. The present invention uses direct contact heat exchange in new and advantageous methods.

The present invention consists of a method for burning slurry, liquid, or gaseous fuels at elevated pressures allows lower quality fuels to yield more energy and higher quality energy due to increased dew point temperatures in flue gases and high temperature heat exchange. The combination of elevated pressures and oxygen rich oxidant allows increased waste heat recovery, higher quality heat recovery, and substantially reduced air pollution. Turbochargers operated by flue gas and pressurized air, force the oxygen into the combustion chamber at increased pressures. Oxygen permeable membranes lower levels of nitrogen and reduce pollution by enhancing the stripping of pollutants from the flue gas and by the absolute reduction of flue gas exhaust. Latent heat recovery and water dilution of combustion mixtures are important aspects of the embodiments of this invention; both are enhanced by the vaporization of influent liquids while contacting influent gasses. High temperature heat exchange is facilitated by direct contact heat exchange means. Substantially reduced pollution levels allow operation in residential and downtown areas where cogenerated heat and coolant can be utilized. This method is particularly useful for converting garbage or sewage into electricity and for increased biomass combustion efficiency; however, advantages of this method can also be realized for most conventional fuels.

SUMMARY OF THE INVENTION

During the conversion of carbon based fuels into more useful forms of energy such as electricity or steam for heating, the energy is either converted into the desired form, lost in the flue gasses, or lost to cooling fluids in a condenser. Energy lost up the stacks in flue gas comprise approximately 14% of the energy originally in the fuel (higher heating value), and much of this energy in the flue gas is in the form of a latent energy of vaporization (absorption) of water vapor and carbon dioxide. While many power plants specifically avoid condensing water from flue gas; the embodiments of this invention are relatively inexpensively protected from corrosion and yield efficiencies that cannot otherwise be achieved. Improved efficiencies are realized due to reduced losses in the flue gasses, due to direct contact heat exchange means, and due to effective use of evaporative cooling in air cycles.

The present method is a largely comprehensive energy conversion method which integrates complimentary technologies associated with air separation, direct contact heat exchange means, flue gas/condensate recirculation, and pollution removal. Two basic principles of operation lead to high efficiencies. Firstly, direct contact heat exchange means are used to provide low compression temperatures and high expansion temperatures for the energy intensive compression and expansion operations. Secondly, air separation is used to supplement high efficiencies and pollution removal.

In addition, the present energy conversion method is based around increased energy recovery from flue gas by enhancing the condensation of vapors by operating heat exchange methods at increased pressures. These vapors would normally leave the method in the flue gas without condensation.

Thereby, the purpose of the present invention is to increase the amount of water condensing, increase the temperature at which this water condenses, provide efficient combustion, provide efficient transfer of heat to influent gases and liquids, and create a favorable environment for removing $NO_x$ and $SO_x$ from flue gas. These advantages are directly or indirectly associated with reducing the mass of water exiting in the undesirable form of vapor in flue gas. By designing a method to operate with heat exchange and condensation, the flue gas temperature is lowered and the maximum theoretical amount of efficiency is increased since the heats of combustion are based on the flue gas leaving the system as a liquid.

For a flue gas which has contacted heat removal embodiments at the dew point of water vapor in the flue gas, the fraction of water vapor originally in the flue gas which actually exits the method is approximately proportional to $[(P^S_{H2O})(M_F)/(P_F)]$. For this approximation, $P^S_{H2O}$ is the saturated pressure of water near the temperature of the last heat removal means, $P_F$ is the flue gas pressure, and $M_F$ is molar flow rate of exiting flue gas. As this approximation shows and as is exercised by the embodiments of this invention, the mass fraction of water leaving the method as flue gas water vapor decreases with 1) increasing flue gas pressure, 2) decreasing mass flow rates of nitrogen (resulting in decreased $M_F$), and 3) decreasing temperature of exiting flue gas (resulting in decreased $P^S_{H2O}$).

An advantage of the present invention is combustion at higher heating values of fuels. This is advantageous for any combustion method and is particularly advantageous to systems with significant amounts of water in the fuel. Such fuels include biomass, garbage, coal slurry, and sewage. This advantage allows fuels such as coal to be easily pressurized in the form of a slurry without loss of energy due to the liquids incorporated in forming the slurry. For high water content fuels, embodiments of this invention allow higher combustion temperatures to be achieved.

Another advantage of this method is enhanced removal of pollutants from the flue gas. Pollutants such as $NO_x$ and $SO_x$ can be removed by a variety of mechanisms including adsorption, absorption, and reaction. Almost without exception, such mechanisms for removing pollutants have rates increasing with increasing thermodynamic forces (activity and fugacity) which increase with increasing vapor pressures of these pollutants. As with water vapor, the fraction of a pollutant which leaves in exiting flue gas is approximately proportional to $[(P_{POLLUTANT})(M_F)/(P_F)]$, where $P_{POLLUTANT}$ is the partial pressure of the pollutant. Likewise, as with water, the mass fraction of pollutant leaving the method in the flue gas decreases with 1) increasing flue gas pressure, 2) decreasing mass flow rates of nitrogen (resulting in decreased $M_F$), and 3) decreasing temperature of exiting flue gas (for thermodynamically limited mechanisms).

Another advantage of the present invention is resultant of the final form of pollutants. Alternative pollution control means incorporate alkali materials which lead to a potential solid waste problem or have scrubbing as a separate operation in which water is added to the flue gas and heat is wasted. The embodiments of this invention reduce air pollution and put pollutants into a form which is easily converted into useful products. The pollution reduction means are enhanced by low temperature expansion of flue gases facilitated by direct contact heat exchange prior to expansion.

Higher pressures, reduced mass of nitrogen, and increased heat transfer coefficients for condensation of vapors result in reduced equipment sizes. Decreased equipment size is also an advantage of the present invention.

Another advantage of certain embodiments of this invention resides around decreased pressure differences during heat exchange. The pressure difference between the two sides of a solid wall heat exchanger are eliminated by using a direct contact heat exchange fluid. This is similar to molten salt technology used with solar receivers where solar energy is focussed on molten salt prior to contacting the molten salt with air used to drive gas turbines. The novelty and utility of this direct contact heat exchange means is also not limited to electrical power generation and applications are defined for use with air-cycle refrigeration systems.

Numerous other advantages are also associated with the direct contact heat exchange means. Consider one example. Upon generation of hot direct contact heat exchange fluid from, for example, a packed column contacting molten salt with flue gas, the molten salt can be easily distributed to several other packed column heat exchangers which are used for heating such things as influent air and influent fuel. Such distribution of heat exchange is more costly when the flue gas itself must be distributed to various remote solid wall heat exchangers.

Heat transfer is very important for the embodiments of the present invention, consider one application of heat transfer during the generation of electrical power. Table 1 gives an energy analysis of a typical steam cycle electrical power generation facility. Unlike an energy balance, a second law energy balance shows losses of what was once the ability of the fuel to produce work. If energy losses are eliminated, less fuel is consumed and the environmental impacts and costs of electrical power generation are decreased.

TABLE 1

Second law analysis of typical coal-fired electrical power generation facility.

| | Steam Cycle % exergy lost |
|---|---|
| Combustion | 24%–32% |
| Heat transfer losses less flue gas losses | 16%–24% |
| Flue gas losses | 10% |
| Condenser & Pump | 1% |
| Turbine inef. losses | 6% |
| Converted to shaft work | 35% |

This second law analysis shows that approximately 20% of the heating value of coal used with a typical steam power plant is directly lost due to heat transfer irreversibilities. A further analysis of this method shows that the 10% flue gas losses (lower heating value) are indirectly related to heat transfer irreversibilities. Also, up to 8% of the combustion losses could be eliminated with advanced regenerative Brayton methods if heat transfer methods were available at temperatures up to 1100 C. (2010 F.) and pressure differences greater than 1500 kPa (220 psia). In total, approximately 38% of energy losses in a steam cycle can be attributed to lack of available heat transfer technology. Based on the 1990 revenue from electrical power generation of $175 billion (EEI Statistical Yearbook), this savings would translate to approximately $10,000,000,000.00 ($10 billion) per year for the United States (assuming fuel costs to be approximately 15% of the cost for electrical power).

Yet another advantage of the present system is associated with the combination of the availability of large amounts of low and intermediate grade heat combined with extremely low pollution generation. These systems can be operated in areas close to large populations or in commercial or downtown districts where the garbage and sewage can be convened to electrical energy, heat from combustion can be directly transferred to central air units and water heaters, and liquified carbon dioxide can be produced for use as a cooling media. Furthermore, the near isentropic expansion of near ambient temperature flue gas through turbine produces large amounts of cool flue gas which can be directly or indirectly used as coolant.

The present invention consists of a method for burning slurry, liquid, or gaseous fuels at elevated pressures allows lower quality fuels to yield more energy and higher quality energy due to increased dew point temperatures in flue gases and high temperature heat exchange. The combination of elevated pressures and oxygen rich oxidant allows increased waste heat recovery, higher quality heat recovery, and substantially reduced air pollution. Turbochargers operated by flue gas and pressurized air, force the oxygen into the combustion chamber at increased pressures. Oxygen permeable membranes lower levels of nitrogen and reduce pollution by enhancing the stripping of pollutants from the flue gas and by the absolute reduction of flue gas exhaust. Latent heat recovery and water dilution of combustion mixtures are important aspects of the embodiments of this invention; both are enhanced by the vaporization of influent liquids while contacting influent gasses. High temperature heat exchange is facilitated by direct contact heat exchange means. Substantially reduced pollution levels allow operation in residential and downtown areas where cogenerated heat and coolant can be utilized. This method is particularly useful for converting garbage or sewage into electricity and for increased biomass combustion efficiency; however, advantages of this method can also be realized for most conventional fuels.

BRIEF DESCRIPTION OF THE DRAWINGS

FIG. 2 is a graph showing the enthalpy versus temperature behavior of vapor laden flue gas, water, fuel, oxygen, and a water-oxygen mixture.

FIG. 3 is a schematic diagram of the packed bed direct contact heat exchanger illustrating features of a packed column applied for heat transfer.

FIG. 4 is a schematic diagram of an alternative gasification means using molten salt as both a direct contact heat exchange fluid and a gasification catalyst.

DESCRIPTION OF THE PREFERRED EMBODIMENT

In the present energy conversion method, condensation of vapors from gas and large surface areas for heat transfer are obtained through direct contact heat transfer and are applied to enhance thermal efficiencies, pollution removal, and coefficients of performance, and specific embodiments use synergistic combinations of air separation, evaporative cooling, and control of stream pressure to further facilitate thermal efficiencies, pollution removal, coefficients of performance, and lower production costs.

The preferred embodiment is an extensive electrical power generation facility designed to provide local electricity supplies as well as cogenerated coolant and heat. To obtain high thermal efficiencies for the generation of shaft work for driving electrical generators, it is desirable to have high temperatures for expansion methods and low temperatures for compression methods. Thus, heat transfer is vital for achieving high thermal efficiencies; whereby, through heat transfer, compression temperatures are kept near ambient temperatures and select expansion temperatures are kept near upper limitations determined by materials of construction.

Heat transfer is enhanced through a method in which an oxygen containing fluid is continuously or intermittently in direct contact with a heat exchange fluid. Direct contact heat exchange is achieved by incorporating packed bed columns in which the heat exchange fluid preferable runs down a column under gravitational force and gases flow upward for a countercurrent heat exchange method.

Figure 1:
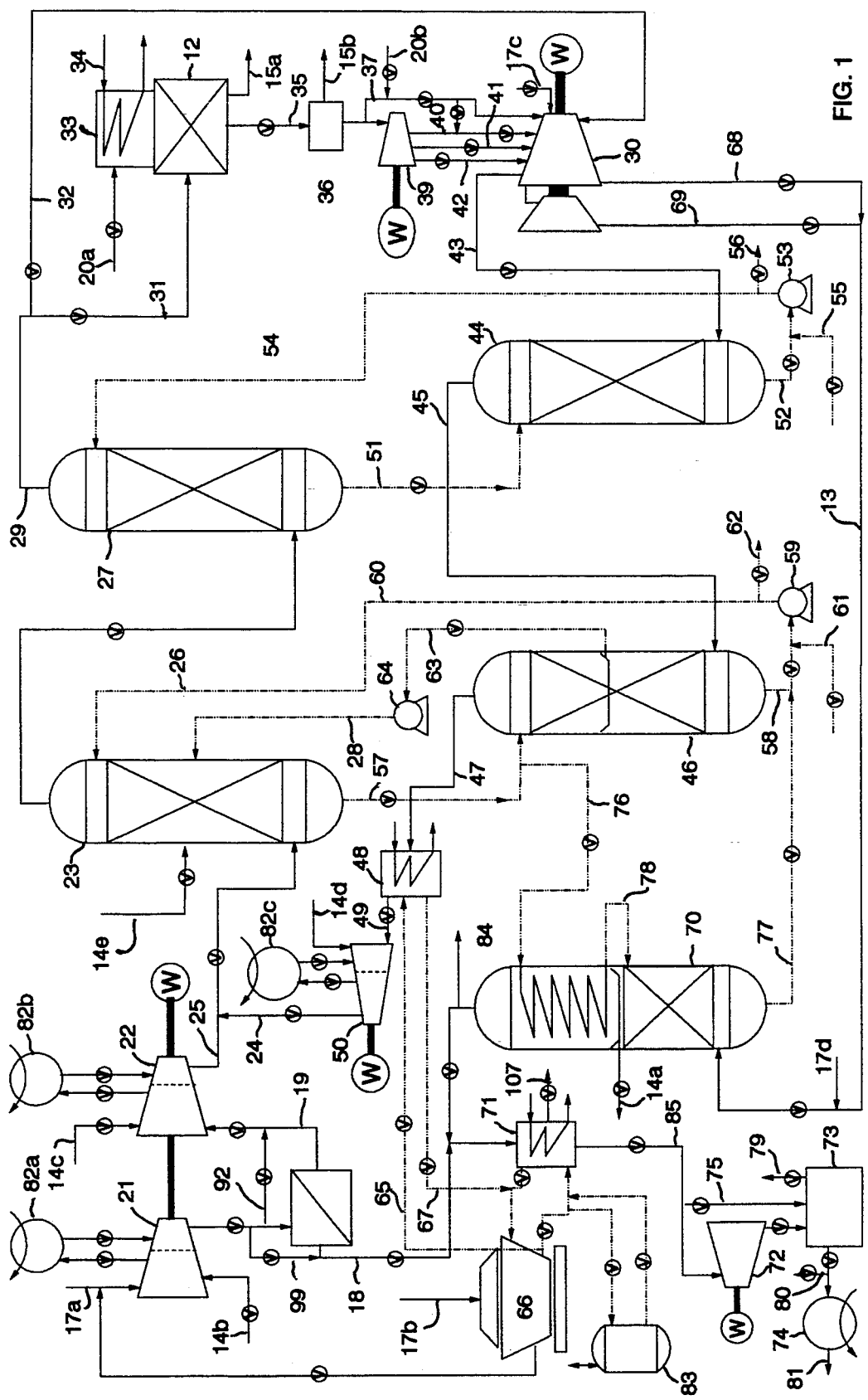
FIG. 1 is a schematic diagram showing the preferred air cycle system with optional features.

FIG. 1 shows the preferred embodiment of this invention. In the preferred method, oxygen permeable membranes 11 reduce the amount of nitrogen present in the an oxidation means 12a. The final form of combustion products consists of any combination of flue gas 13, liquid 14a, and ash 15a.

In the preferred embodiments, oxygen permeable membranes 11 contained in a vessel 16 facilitate the separation of air 17a and 17b into an oxygen depleted gas (ODG) stream 18 and an oxygen enriched gas (OEG) stream 19. The OEG stream 19 then contacts fuel 20a in an oxidation means 12a which preferable is operates as a gasifier, but alternatively operates with complete combustion.

Since the partial pressure of oxygen in air 17a is substantially lower than the sum of nitrogen and oxygen partial pressures, the preferred embodiment must have at least one compression means 21 or 22. FIG. 1 illustrates two compression means, one 21 prior to the oxygen permeable membranes 11 and one 22 after the oxygen permeable membranes 11.

In the preferred embodiment, water 14b is added prior to compression 21 to reduce temperatures and compression costs prior to contact with oxygen selective membranes 11. Partial separation of oxygen from nitrogen occurs in the oxygen permeable membrane means 16; after which, the OEG stream 19 is mixed with water 14c and further compressed 22. The water addition means preferably forms a fine mist prior to compression, and added quantifies are such that the mixture is at water's dew point after compression 22, and the manner of addition is such that quantities of liquid present are sufficiently low (<10%) so as to remain suspended in the gas phase and minimize erosion of the compression apparatus.

In the preferred embodiment, recirculated flue gases 24 are mixed with the compressed OEG 25 prior to a heat exchange. The preferred heat exchange means is a packed column 23 designed to directly contact the influents with hot heat exchange fluid. The heat exchange fluid is preferably molten salt, molten metal, oil, water, or various combinations of compounds which provide sufficiently low viscosity (<500 cp) and sufficiently low vapor pressures (<0.1 atm) over the range of temperatures of usage. The hot heat exchange fluid preferable enters at the top of the column 23 and flows countercurrent to upward flowing influents.

Due to constraints on viscosity and vapor pressures of the heat exchange fluids, the influents of the preferred embodiment are directed into a second heat exchange means after exiting the first heat exchange means. Preferably, the second heat exchange means is a packed column 27 designed to operate with a different heat exchange fluid which is capable of operating at <500 cp and <0.1 atm partial pressure at temperatures ranging from 500 C. to 1000 C. The preferred direct contact heat exchange fluid for vessel 27 is a molten mixture of sodium, potassium, and lithium carbonates.

The preferred direct contact heat exchangers 23 and 27 readily allow heat exchange and simulations evaporation of water into the influents. The water is either injected directly into vessel 23 via stream 14e or recirculated as part of the heat exchange fluid 28. Recirculating water alternative to recirculating flue gases or introducing excess air facilitates the control of combustion temperatures while reducing costs for compression equipment and reducing losses associated with compression.

Upon preheating, the influents exiting the second heat exchange means in stream 29 are ready for combustion. Stagewise combustion is preferred to complete combustion in one stage since stagewise combustion results in an overall higher average temperature of expansion while not overheating the metals of construction, and so, the preferred embodiment uses a gasification means 12a to create a partially oxidized gaseous stream which can be further mixed with oxygen in a turbine to complete combustion. To limit the combustion in the gasifier, stream 29 is split into a stream 31 which enters the gasifier and a stream 32 which is directed into a turbine 30. The split is controlled by valves.

Fuel 20a is preferable preheated prior to being introduced into the gasifier 12a. Methods known in the science can be used in designing the fuel preheating heat exchange means 33; whereby, both convention solid wall heat exchangers or direct contact heat exchangers are acceptable. The fluid supplying the heat 34 is preferably supplied by a sidestream of direct contact heat exchange fluids used elsewhere in the method. Alternatively, the fluid 34 is a separate heat exchange fluid or flue gas stream. Methods known in the science are sufficient for designing the oxidation means 12a, where oxidation means separate from the turbine 30 are not necessary for liquid or gaseous fuels and when the turbine a appropriately adapted. For slurry or solid fuels the oxidation means preferably utilizes a flow of molten salt and fuel where the molten salt is introduced via stream 20a and exits via stream 15a. Alternatively, a moving bed gasifiers which releases ash 15a in the form of molten slag offers good performance. Further cleaning of the low B.t.u. fuel resulting from the preferred gasification method is achieved by using stream 35 to direct the low B.t.u. fuel into an apparatus 36 which uses methods known in the science to remove particulates. Typical methods use ceramic filters or cyclones. Since stream 35 is at significantly lower flow rates than the flow 29 prior to the split, the additional advantage of reduced flue gas cleanup is realized with gasification alternative to complete combustion.

After cleaning, stream 37 directs a split of the low B.t.u. fuel into the main gas turbine 30. The main stream of low B.t.u. fuel 38 is directed into the splitting gas turbine 39. The preferred embodiment uses the splitting gas turbine 39 to recover energy from compressed low B.t.u. fuel while the low B.t.u. fuel is expanded to yield various splits at pressures near the pressures at which the splits are introduced into the main gas turbine 30. Streams 40, 41, and 42 direct splits of increasingly low pressure low B.t.u. fuel into the main gas turbine 30. Fuel from these streams react with oxygen introduced into the main turbine by stream 32.

After turbine expansion the flue gas is split into a stream for recirculation 43 and a stream to be prepared for release 13.

Prior to being mixed with influents, recirculated flue gas (RFG) is cooled to both recover energy and to reduce the energy needed for re-compression. During recirculation in the preferred embodiment, stream 43 connects the RFG to heat exchanger 44, stream 45 directs the RFG from heat exchanger 44 to another heat exchanger 46 then stream 47 directs the RFG to another heat exchanger 48, and finally stream 49 connects the RFG to a compressor 50 exiting to stream 24 which joins with the OEG stream 25. RFG is preferably maintained at a pressure greater than one atmosphere and more preferably at a pressure between 2 and 5 atmospheres. Advantages of 2-5 atm RFG pressures include: 1.) reduced size for costly equipment such as turbines 30, compressors 50, conduits 43, 45, and 47, and heat exchangers 44, 46, and 48, 2.) further reduced the size and cost of heat exchanger 44, 46, and 48 due to higher pressure gases having higher heat transfer coefficients, and 3.) cogenerated heat condensing water vapors (optionally from heat exchanger 48) is available at higher temperatures.

In the preferred embodiment, heat exchanger 44 is a direct contact heat exchanger which heats the direct contact heat exchange fluid (DCHEF) cooled by heat exchanger 27. Stream 51 directs the DCHEF from heat exchanger 27 to heat exchanger 44. Typically the pressure in heat exchanger 27 is greater than that in heat exchanger 44, and so, only a valve is needed for flow control. Stream 52 directs the DCHEF from heat exchanger 27 to a pump 53 which increases the pressure of the DCHEF and allows the DCHEF to proceed to heat exchanger 27 via stream 54. Since the DCHEF is put in direct contact with flue gases, the DCHEF undergoes processing to remove suspended solids. Such processing typically consists of filtering, centrifuging, or settling. In the preferred embodiment, streams 55 and 56 allow access to such filters and centrifuges.

In the preferred embodiment, heat exchanger 46 is a direct contact heat exchanger which heats the direct contact heat exchange fluid (DCHEF) cooled by direct contact heat exchanger 23. Stream 57 directs the DCHEF from heat exchanger 23 to heat exchanger 46. Typically the pressure in heat exchanger 23 is greater than that in heat exchanger 46, and so, only a valve is needed for flow control. Stream 58 directs the DCHEF from heat exchanger 46 to a pump 59 which increases the pressure of the DCHEF and allows the DCHEF to proceed to heat exchanger 23 via stream 60. Streams 61 and 62 allow treatment of the DCHEF.

When temperatures are reduced in heat exchanger 46, the partial pressure of water decreases and part of the water in the flue gas transfers into the DCHEF. This condensed water can be recirculated to the influents without compression costs provided that it is in a liquid phase at sufficiently low temperatures (120° C). An intermediate DCHEF distributer in the packed column heat exchanger 46 allows collection of part the DCHEF at these lower temperatures, whereby, streams 63 and 68 and pump 64 direct the fluid back to column 23.

To complete recirculation of the RFG, the RFG is further cooled by a heat exchange means and compressed by a compression means 50. The further cooling reduces compression costs and is necessary to provide the driving force for heat transfer in the first heat exchange means 23. The preferred means of further cooling the RFG is a direct contact heat exchanger in which the cooling water is supplied 65 from a cooling tower 66 and returned 67 to the cooling tower after use.

In the preferred embodiment, the flue gas prepared for release proceeds from the main gas turbine 30 via streams 68 or 69 to a heat exchange means 70 for thermal energy recovery, through another heat exchange means 71 primarily to decrease temperature, through a turbine means 72 to recover energy and further reduce temperature, through a low temperature $SO_x$ recovery means 73, and finally to an end application which makes use of the cool flue gases.

The low temperature $SO_x$ recovery means is preferably based on physical absorption of $SO_x$ into a liquid phase such as an ethanol-water mixture at temperatures typically less than 10 C. Low temperatures are desirable to facilitate absorption. The lower temperatures also reduce equipment size since the gas is more dense. The lower temperatures are in part achieved by expansion from a pressure of 1.1 to 2.0 atmospheres to atmospheric pressure. Depending upon sulfur content of the coal, the necessity of and degree of sulfur removal will vary; whereby, when sulfur removal is not necessary, expansion of the flue gas to pressures near 1 atm at higher temperatures and in the main gas turbine 30 is desired. Two modes of operation are thus defined.

When sulfur removal is desired, the flue gas exits the main gas turbine at a pressure greater than 1.1 aim and less than 2 atm via stream 68, and prior to entering the $SO_x$ recovery means the flue gas is expanded in a low temperature turbine 72. A second mode of operation is used when $SO_x$ removal is not necessary. For the second mode of operation, the flue gas expands to near 1 atm in the main gas turbine and exits the turbine via stream 69, and downstream the flue gas optionally bypasses the low temperature turbine 72 via stream 75. The flue gas is also optionally released after heat exchanger 70.

In the preferred embodiment and for either mode of operation, the flue gases exiting the main gas turbine 30 are directed to a heat exchange means 70 for energy recovery. This heat exchange means 70 is preferably a direct contact heat exchange means at temperatures greater than about 100 C. and a conventional solid wall heat exchange means at lower temperatures. FIG. 1 illustrates how this flue gas can use the same DCHEF as heat exchanger 46 through interconnecting streams 76 and 77. In heat exchanger 70 the DCHEF is preferably first routed through a solid wall heat exchange means and then through stream 78 to the packed bed direct contact heat exchange means. The solid wall heat exchange means has advantages of allowing the condensing water to be collected and discharged from the method 14a. The discharged water may be treated for release reused at other locations 14b, 14c, and 14d.

The exit temperature of heat exchanger 70 is largely determined by the temperature of streams 24 and 25 and is typically greater than 70 C. To achieve the desired lower temperature further cooling is achieved by heat exchange means 71. Heat exchanger 71 is preferably a packed bed direct contact heat exchanger with cooling water supplied by a cooling tower 66. Exit temperatures of heat exchanger 71 are near the ambient wet bulb temperature of water. Countercurrent operation with water exiting at temperatures near those of entering gases minimizes concentration of $SO_x$ in the water exiting exchanger 71; and so, countercurrent operation minimizes $SO_x$ removal needs for exiting water.

The preferred embodiment is completed with $SO_x$ removal in the $SO_x$ recovery means. The $SO_x$ removal means uses methods known in the science and typically consists of one column for absorbing $SO_x$ from the flue gas and one stripping column for concentrating the $SO_x$ products 79. After $SO_x$ removal, chilled flue gas is available for direct use 80 or for heat exchange 74. Flue gas products are released at near atmospheric temperatures through stream 81. Flue gas products are also released from the direct use method of stream 80.

Figure 5:
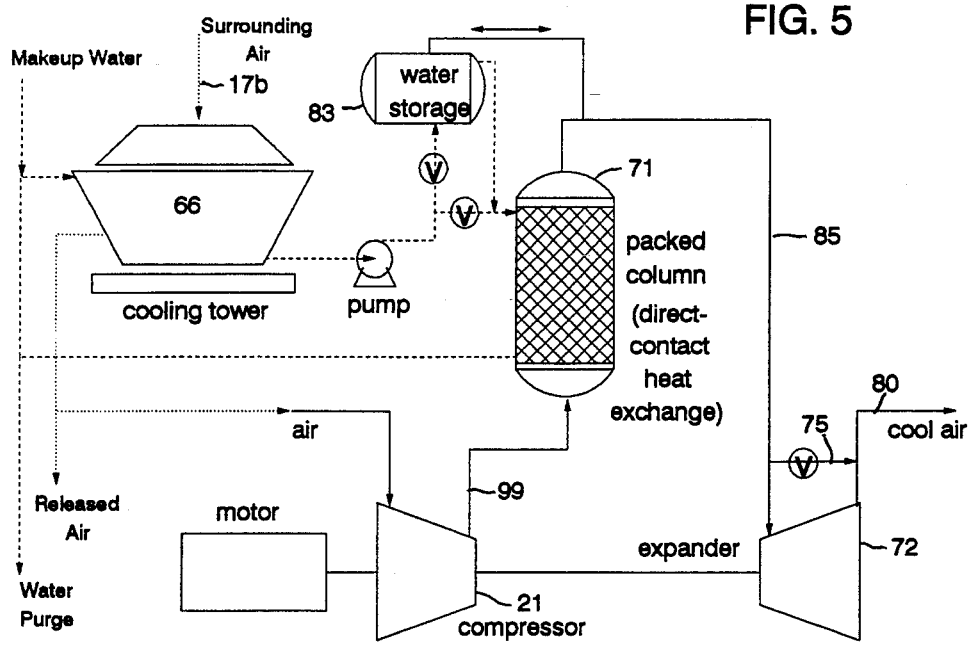
FIG. 5 is a method flow of an alternative air cycle embodiment using direct contact heat exchange and evaporative cooling to produce a stream of cool air.

Advantages of the preferred embodiments water recirculation methods are illustrated by comparing the enthalpy-temperature behavior of water containing flue gasses, water influent, fuel influent, gas influent, and mixed water-gas influent as shown in FIG. 2. FIG. 2 gives enthalpy as a function of temperature at 10 atmospheres pressure where the mass of the flue gas is equal to the combined masses of fuel, water, and influent gasses. As illustrated in FIG. 5, the boiling of water results in a near infinite derivative of enthalpy with respect to temperature and leads to a pinch point which increases entropy during heat exchange methods. The enthalpy-temperature behavior of the influent water-gases system more closely approximates the flue gas behavior and allows the use of latent heats of condensation of flue gas vapors to be used to vaporize influent water. Therefore, more heat can be returned to the method for the preferred heat exchange methods of this invention where heat is transferred to water while in contact with influent gases.

Options of the preferred embodiments of this invention include: 1.) shaft energy input versus motors at compressors 21, 22, and 50, 2.) shaft energy removal versus generators at turbines 30 and 72, 3.) use of intermediate heat exchange means 82a, 82b, and 82c at compression means 21, 22, and 50 to reduce work expended for compression, 4.) use of a water storage tank 83 to store cool water during the night for later use during the day, and 5.) discharging of flue gas immediately after heat exchanger 70 and corresponding use of other streams to provide cooling for applications of 74 and 80. The preferred means of intermediate heat exchange 82a, 82b, and 82c is a packed bed column providing direct contact heat exchange between cooling water supplied from the cooling tower 66 and gases of the compressor 21, 22, or 50. Storage of cooler water during the night provides a cooler water source than is available from the cooling tower during the warmer wet bulb temperatures of the day.

Operational constraints such as a reasonable temperature difference for heat transfer and low pressures of flue gas streams 45, 68, and 69 decrease the amount of latent heat which can be recovered by the preferred embodiment; however, the creation of water and acidic gases during combustion enhance condensation of flue gases at higher temperatures and increase latent heat recovery above what would otherwise be expected. This is illustrated by FIG. 2.

In the preferred embodiment, materials of construction determine the desired maximum combustion temperature. Nitrogen, water, carbon dioxide, and excess oxygen can be added to control temperature. Also, heat transfer at the combustion means can be used to in part to control oxidation temperatures.

A variety of fuels work with this method; the preferred fuels are sewage and garbage since these fuels are inexpensive and use of sewage and garbage with this method alleviates costs with alternative disposal means. Sewage is preferable thickened before mixing with other fuels. Garbage is preferable sorted and shredded prior to mixing with other fuels. The slurry nature of the sewage-garbage mixture facilitates pumping to the pressures of the combustion method. Also, other conventional fuels are alternatively added to increase the heating value of the fuel. Preferred conventional fuels are coal or biomass.

In the preferred embodiment, oxygen is selectively concentrated from air and compressed or pumped into the combustion means. The preferred method for separating oxygen from air is with oxygen selective membranes 11, multiple passes of the fluid through membranes may be necessary to achieve the desired nitrogen removal. Typically, membranes 11, are arranged in a vessel 16 such that air flows past the membrane while oxygen diffuses through the membrane. Upon passage by the membranes the air becomes depleted in oxygen 18 and is routed to a turbine 72 for low temperature 18 expansion and recovery of some of the expended compression work. If multiple passes through the membranes are incorporated, the gases between the first and last membrane are purged. Purging could be performed through a turbine or directly into the atmosphere. Multiple passes through membranes is the preferred means for obtaining oxygen levels greater than 40 mol %.

Air typically contains about 21 mol % oxygen. Advantages of the embodiments of this invention are realized for molar compositions from 30 to 100 mol % oxygen in the oxygen enriched influents. Preferable the oxygen content of influents is from 35 to 95 mol %. Compression costs increase exponentially with oxygen purity and optimum purities depend on pollution removal needs.

The combustion pressure of the preferred embodiment is between 1 and 200 atmospheres. More preferably the pressure is between 2 and 70 atmospheres, and most preferably it is between 5 and 25 atmospheres. Typically, increased pressure enhances heat transfer, reduces equipment sizes, and allows for easier pollution treatment, while at higher pressures the increased wall thickness of vessels adds cost faster than the decreased equipment sizes reduce cost.

Having described the preferred embodiment, details of the direct contact heat exchange means will be described.

Direct contact heat exchange offers distinct advantages of increased areas for heat transfer (and associated reduced need for temperature driving forces), varying ranges of temperatures of operation, and costs associated with the solid walls of conventional heat exchangers. Specific advantages of direct contact heat exchange with the preferred embodiment of this invention includes:

1.) Use of molten salts (e.g. molten carbonate salts) for heat exchange at temperatures in excess of 700 C. provide increased thermal efficiencies when alternative conventional heat exchange means fail.
2.) Use of ceramic packing for high temperature heat exchange reduces costs associated with controlling corrosion and reduces construction costs associated with welding conventional solid wall heat exchanger; systems failure is also less likely.
3.) Use of cooling tower water for direct contact heat exchange prior to $SO_x$ removal allows lower temperatures for stream 85 to be attained due to large heat transfer surfaces.

and

4.) Direct contact heat exchange readily allows the simultaneous transfer of heat and evaporation of water as practiced in heat exchanger 23.

A potential disadvantage of direct contact heat exchange is varying enthalpy-temperature (H-T) behavior between the heat exchange fluid and the gases of heat transfer. Illustrated in FIG. 3 is a direct contact heat exchange arrangement in which a sidestream 63 and 28 compensates for varying H-T behavior between the gas and DCHEF. Collection and removal/addition of DCHEF at redistributors 86 allows compensation for varying H-T behavior and is not limited to specific applications for the removed DCHEF. Stream 87 is used as needed and returned via stream 88. Multiple DCHEF sidestreams is optional. Sidestreams can also be used to control the fractionation and removal of pollutants. (This is discussed later. See FIG. 7.)

Also illustrated by FIG. 3 is the typical arrangement of a packed column. Typically in a packed column, liquid 57 enters at the top of the column and proceeds through a distributor 89 to provide even wetting of the packing 90 and then down the column under the influence of gravity. Intermediate support 91 allows greater heights of packing to be used without promoting the crushing of packing at the lower part of the column. Disengaging spaces are typically provided above and below the packing. Gas flows through the column under the influence of pressure differentials and may flow downward or upward. Upward and countercurrent flow is preferred.

Having described much of the preferred embodiment, the most preferred operating conditions are presently described. Alternative operating conditions are within the embodiments of this invention, and streams which are not specifically specified are defined by energy and mass balances of the system. Air entry is preferably through stream 17a and oxygen enrichment is preferably to 80 mol % in stream 25 at a temperature of 100 C. and a pressure of 20 atm. The DCHEF of column 23 is preferably a solution (concentration varies throughout the column) of potassium sulfate in water, and exit temperatures of column 29 are preferably 475 C. The DCHEF of column 27 is preferably a mixture of carbonate salts, and stream 29 preferably exits at a temperature of 950 C. The split of stream 31 to stream 32 is preferably 1:4 and a coal slurry fuel is preferably added 20a at amount providing 95% to 99% of molar stoichiometries for complete combustion to water and carbon dioxide with respect to oxygen in stream 29. The preferred particulate separation means (36) is one cyclone. Preferably, streams 37, 40, 41, and 42 have equal flow rates. The preferred maximum temperature in the method is 1400 C. Air cooled 17c turbines are preferred and minimum temperatures in the turbine are preferably greater than 950 C. The pressure of stream 45 is preferably 4 atm and the volume of stream 45 is dependent upon already specified variables. The Average temperature driving forces for heat exchange are preferably 15 C. Small quantities of oxygen introduced through stream 17d are preferably from stream 29 and are such that combustion to water and carbon dioxide is complete. Other parameters are dependent upon specific modes of operation as specified in this document.

Having described the preferred embodiment, alternatives and options to the embodiments will be described.

The embodiments of this invention are capable of substantially reducing pollution due to increased $SO_x$ removal driving forces, by the absolute reduction in the volume of gaseous effluents, and enhanced methods made possible by large areas for heat transfer. Furthermore, this pollution reduction can be achieved without using alkali minerals which form a solid waste when interacting with $SO_x$ and $NO_x$ pollutants.

Addition of water prior to the oxygen selective membranes should be practiced or avoided with regard to impacts on membrane performance. For applications where water has minimal impact on membrane performance, water addition is preferably as a fine mist introduced by an atomizing nozzle. Preferably, sufficient water should be added such that temperatures in the membrane means approach dew point temperatures but such that condensation is not induced in the vapor phase, on surfaces, or in membrane pores meant for oxygen passage.

Options on compressing oxygen and removing oxygen from air are not limited to oxygen permeable membranes. It should be noted that other methods for removing nitrogen from air may be practiced within the scope of this invention.

For applications of oxygen permeable membranes, energy can be recovered from ODG 18 by expansion through a turbine 72. Furthermore, certain applications of the embodiments of this invention allow synergistic applications of the available oxygen for other applications. A good example of this type of application is during the combustion of sewage. At such a waste water treatment facility, oxygen can be used to feed aerobic bacteria which are capable of converting soluble organics into gaseous fuels.

Options on the preferred heat exchange means are not limited to OEG influents. The preferred heat exchange means is not limited to influent oxygen enriched fluids and may be used in combination with any influent gas streams. Use of stream 92 bypasses the air separation means and allows operation with air.

The previously described packed bed column designs provide continuous and simultaneous contact of the water and influent gases during heat transfer; similar types of heat exchange can be accomplished by alternating (i.e. intermittent) contact of the influent gas with the tubes and influent water or by running a liquid over solid wall heat exchange surfaces. Methods designed to alternate contact with heat transfer can be achieved through alternating heat exchangers and static mixing.

The use of alkali materials to enhance the removal of pollutants is not the preferred method of this invention; however, alternative embodiments within the scope of this invention can apply alkali materials to enhance pollution removal.

The embodiments of this invention are not limited to specific pollution control means. Pollution control units may be any of many disclosed and currently applied procedures and can be incorporated as appropriate throughout the method. The scale of the pollution control equipment in this embodiment is smaller than what would be necessary if it were designed to handle the entire mass of flue gas at near atmospheric pressure.

Options on fuels are not limited to those mentioned in the preferred embodiment description. Although there are specific advantages of this system applied to fuels high in water content, it should be understood that the scope of this invention is not limited to fuels with high water content. Higher temperatures are attainable with OEG's than with air; these higher temperatures can result in increased availability of energy for certain applications. The methods of this invention are not limited to one fuel feed or one liquid feed. Currently practiced combustion or incineration methods could be practiced within the scope of the embodiments of this invention.

The transfer of heat into the high water content fuel has advantages as a means of providing the availability of higher quality energy. Distinct advantages exist for the combustion of high water content fuels. This method has particular advantages in converting coal, garbage, sewage, or biomass into electrical and thermal energy. With this method the bulk material is transported to location, ground to the desired size and mixed with a liquid (e.g. water or oil) to form a slurry which is readily pressurized with a minimum of energy input. Many methods currently practiced or disclosed can readily be improved by incorporating the embodiments of this invention. Alternatively, hoppers can be filled with solid fuel, sealed, pressurized, and then conveyed to the combustion means.

Fuel slurries with particularly high water content such as sewage can be thickened by proven methods in solid/liquid separation such as thickeners which separate the stream into a higher energy stream for combustion and a lower energy stream which could be treated to remove waste by alternative methods. In addition, high energy fuels such as coal can be directly added to the low energy fuels to boost the energy content to a critical value. Advantages of enhancing combustion reside in adding coal or coal slurries to sewage prior to combustion.

For non-volatile and water containing fuels, heat transfer to the fuel while in contact with a gas such as OEG will have reduced entropy increases as compared to injecting the water laden fuel into the combustion means. Transferring heat to these slurries is preferably intermittent with mixing. Alternatively, direct contact heat exchange is feasible in which the less dense fuel proceeds upward in a downward flowing molten salt. As the solid fuel proceeds up through the molten salt, a more dense and smaller ash is formed, and upon approximately 90% oxidation the ash reverses flow from an upward direction to a downward direction and proceeds with the molten salt for later removal. Therein, is the option of combining heat exchange and gasification of fuel in one apparatus as illustrated by FIG. 4.

As illustrated by FIG. 4, for this embodiment molten salt is the continuous phase 93. The combined heat exchanger—gasifier 94 has hot molten salt entering at the top of the column and flows countercurrent to OEG 96 entering at an intermediate location and cooler slurry fuel 20 entering at the bottom of the column. The molten salt and residual ash exit via stream 97 at the bottom of the column. The gasification products 35 exit at the top of the column. Disengaging spaces and demister pads 98 minimize entrainment of salt in the gasification products 35 and unburned fuel in the salt discharge 35.

Ash removal from a molten salt stream can be facilitated by adding water. The preferred means of recycling the added water and soluble salt is via stream 14e.

Options on combustion means go beyond the described moving bed gasification units. Fluidized bed combustors have a good service history. A rotating kiln combustion means would be preferred for waste not suitable for fluidized beds or moving beds. The preferred moving bed methods have operational advantages including the selective removal of high residence time ash without the complexity of a rotating kiln. Fluidized beds with feed introduced via atomizing nozzles would provide a combustion system where the fluidized bed is only used by that portion of the fuel which does not burn prior to reaching the bed. Higher temperatures are reached in this embodiment because of the evaporation of water from the fuel before it reaches the bed. Atomizers are optional in lou of other methods for discharging liquids or slurries.

Furthermore, the embodiments of this invention are not limited to one combustion means. A second combustion means located after the main gas turbine 30 and prior to heat exchanger 70 adjusts $NO_x$ pollutants toward a more favorable equilibrium at lower pressures. Preferred operation with a second burn is with oxygen stoichiometries of approximately 95% to 99% of molar stoichiometric values (necessary for complete combustion to water and carbon dioxide) for combustion in the main gas turbine 30 and stoichiometries greater than 100% of the molar stoichiometry for complete combustion in the second combustion means. Under such operation high $NO_x$ concentrations should not be achieved at any part of the method and $NO_x$ control should be easily achieved.

Options on a liquid carbon dioxide sidestream are particularly advantageous on embodiments of this invention since the flue gas is depleted in nitrogen (i.e. more concentrated in carbon dioxide) and is optionally available at greater than atmosphere pressures and near ambient pressures.

Options on downtown cogeneration applications are created by the low pollution and high efficiencies of the embodiments of this invention. Specifically, embodiments of this invention can be practiced close to residential and business areas. Such locations provide markets for heat, coolant, for liquified carbon dioxide streams, and for direct application of mechanical energy without the conversion into electricity.

To maintain customer satisfaction of the end cooling means 80 and 74, cooling must be available at all times. Variable fuel supplies and prices impact the operation of the preferred embodiments of this invention; accordingly, alternative modes of operation are justified depending upon the sulfur content of the fuel. Operation with low $SO_x$ coal makes it preferable to expand flue gases to near 1 atm and thereby exit the main gas turbine through stream 69. Under such operation the flue gases exit the method via stream 84 and an alternative means of supplying coolant is used.

The alternative means of supplying coolant uses compressor 21 to compress air and directs part of the compressed gases around the air separation means 16 via stream 99. This air stream proceeds through heat exchange means 71 and through the expansion means 72 to provide coolant 80 and 81. This path of operation is more concisely illustrated by FIG. 5.

FIG. 5 illustrates that portion of the preferred embodiment of FIG. 1 which provides a means for air conditioning. The air conditioning (AC) includes moisture control and a reduction in temperatures. For AC operation, use of stream 17b over stream 17a has advantages of reduced compression costs. When wet bulb temperatures of stream 17b are sufficiently low, stream 75 can be used to by-pass turbine 72 which is advantageous if measures are taken to reduce energy expended for compression 21. Preferred pressure ratios (PR's) of operation (P of stream 99 divided by P of stream 17b) for optimal AC coefficients of performance (COP's) are from 1.05 to 2.0. More preferred PR's are from 1.15 to 1.45. A typical value for the PR is 1.3. The COP's are dependent on the PR's, and at a PR of 1.3, COP's typically range from 1.5 to 3.5. Use of stream 75 corresponds to use of only evaporative cooling and results of COP's of approximately 15.0.

Averaged COP's can be assigned to the AC system to arrive at a seasonally adjusted COP (SCOP). SCOP values depend upon the extent of use of stream 75 and the evaporative cooling mode which depends upon the ambient wet bulb temperatures which depends on geographical location. For locations such as Goodland, Kans., the evaporative cooling mode can be used and SCOP values are around 3.7. For locations such as Goodland, this AC method has advantages of decreased energy consumption over typical CFC based AC systems. Other advantages include: no CFC's are used by this method, this method has inherent control of moisture, and this method has increased displacement of interior air with outside air as compared to typical CFC based AC systems.

Optimal operation of this AC system includes monitoring of ambient conditions (e.g. the temperature of the cooling tower water) to switch between the evaporative cooling mode and the turbine expansion mode to provide both comfort and economy. In addition to using stream 75 to control the mode of operation, the rotational speed of the compressor 21 and expander 72 can be varied to provide optimal PR's. Use of the water storage 83 should be such that water is stored during the coolest hours of the night and used during the warmest hours of the day. More air is typically needed to operate the tower than is needed for AC applications and so air is also released by the tower. Water evaporates and so a makeup water line and supply is necessary. Also, to prevent the concentration of undesirable compounds in the cooling tower water, a purge stream is also necessary.

Figure 6:
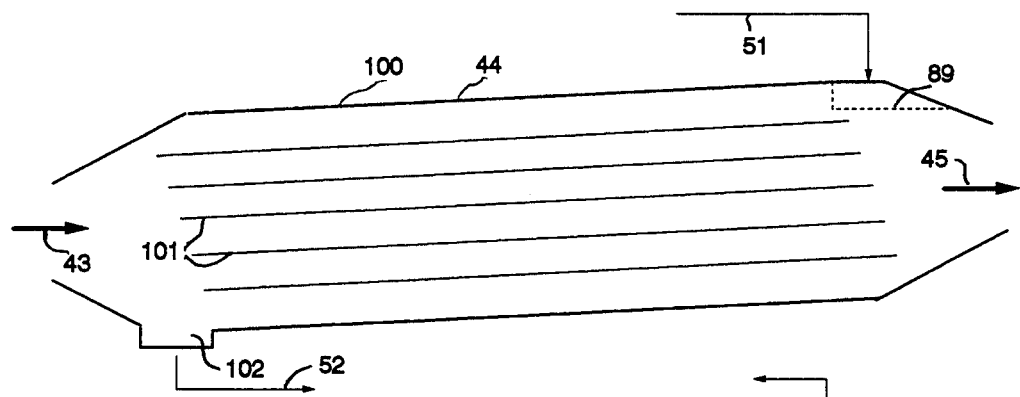
FIG. 6 is a schematic diagram of a horizontal packed bed heat exchange vessel.

The direct contact heat exchange means of this invention are not limited to packed bed columns. FIG. 6 illustrates a horizontal vessel or piece of conduit 100 in which vapor and liquid phases run countercurrent. A distributer 89 distributes influent DCHEF over a series of internal channels, ducts, or specially designed packing 101 which directs the DCHEF countercurrent to the gas and through the vessel 100. A disengaging pan 102 at the end of the vessel allows the DCHEF to be collected and circulated.

Flue gas turbines are optional on embodiments of this invention and their elimination provides advantages in reducing capital costs or totally alleviating problems with flue gas turbine operation. A back-pressure containment means such as a backpressure valve is optional over a turbine to enhance condensation of effluents and $SO_x$ recovery. For power generation, heat can be transferred to working fluids by direct contact means or conventional solid wall heat exchangers.

As an example of $SO_x$ removal, consider a hypothetical $SO_x$ stream 85° at 30 C., 1.5 atm, and 0.5 mole % $SO_x$. This stream is in equilibrium with a 1 wt % $SO_x$ in water solution. If expanded to 1 atm, the corresponding stream would be at approximately 1 C. and would be in equilibrium with a 1.5 wt % $SO_x$ in water solution. The driving forces for $SO_x$ removal are thus greater for pressurized $SO_x$ containing streams after expansion than prior to expansion. Thus, the $SO_x$ removal means of the preferred embodiment of FIG. 1 is preferred; however, the embodiments of this invention are not limited to this preferred $SO_x$ removal means. Placing the $SO_x$ removal means on stream 85 may be advantageous for some applications.

An alternative method of operation uses stream 80 directly or indirectly with heat exchanger 71 to achieve temperatures lower than the cooling tower 66 water. Such operation allows more expansion of flue gases to occur at high temperatures but still requires a minimum of expansion through turbine 72.

$SO_x$ removal at temperatures greater than 0 C. and with water as the absorbent are also optional. The $SO_x$ removal means of this invention are also not limited to use with method incorporating air separation means and OEG streams.

Figure 7:
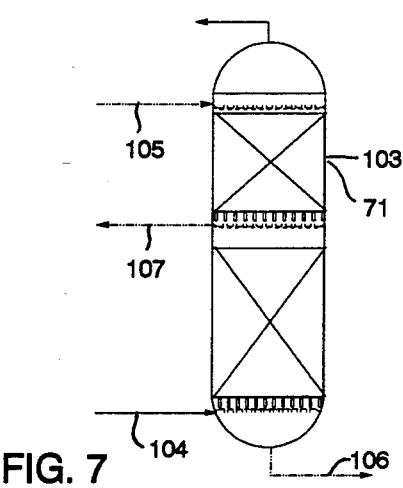
FIG. 7 is a schematic diagram of a direct contact heat exchange column with a lower temperature sidestream concentrated in $SO_x$.

The effective application of direct contact heat exchange, alone, will remove large quantities of $SO_x$. FIG. 7 shows the same column as column 46 or FIG. 5, only the streams of column 103 of FIG. 7 are different and more characteristic of an alternative for heat exchanger 71 of FIG. 1. Here, $SO_x$ laden flue gas 104 enters at the bottom of the column 103 and is contacted with a water mixture 105, preferably water from cooling tower 66. Part 106 of the water mixture exits at the bottom of the column at a temperature of approximately 80 C. and with minimal $SO_x$, since $SO_x$ has minimal solubility in water at 80 C. To attain this temperature, the flow rate of stream 106 is has a heat capacity (specific heat multiplied time mass flow rate) approximately equal to that of the entering flue gas 104.

At the higher temperatures of the lower part of the column 103, $SO_x$ solubility in water is minimal, and so, the column serves primarily as a direct contact heat exchanger. However, at the lower temperatures on the top part of the column 103, $SO_x$ has significant solubility in water (or other solvent) removed in by stream 107. Methods know in the science (see Chapter 16 of *Equilibrium-Stage Separation Operations in Chemical Engineering* by Ernest J. Henley and J. D. Seader) for designing stripping methods can be used to specify the flow rate of stream 107, the type of packing in the upper part of the column, the diameter of the upper part of the column, and the height of packing in the upper part of the column.

When the pressure of stream 104 in atmospheres is greater than the sum [mass flow rate of stream 104 plus the mass flow rate of stream 85] divided by the mass flow rate of stream 85, advantages can be realized by operating vessel 48 as a stripping column similar to vessel 103. Under such optional operation stream 107 is preferable directed from vessel 103 to vessel 48 and further concentrated in $SO_x$.

Stream 107 must undergo further processing to attain $SO_x$ in a concentrated form. When $SO_x$-free stream 107 has a similar composition as the water of cooling tower 66, stream 107 is preferably recycled by solid wall heat exchange to temperatures of approximately 30 C. followed by mixing with stream 105 prior to entering column 103.

For operation of column 103 at temperatures less than 0 C., water-alcohol or water-electrolyte mixtures can be used. Stream 80 can be used directly or indirectly to reduce the temperature of column 104 as column 71 to values lower than the temperature of cooling water of tower 66.

Options on compression and expansion means are not limited to axial flow compressors and axial flow turbines. Use of rotary lobe, centrifugal, and piston cylinder expansion and compression means are optional.

While this invention has been described fully and completely with special emphasis upon preferred embodiments, it should be understood that within the scope of the appended claims the invention may be practiced otherwise than as specifically described herein. The following example illustrates how water can be used to replace nitrogen during combustion methods.

Example—Control of Combustion Temperatures

To calculate the quantities of air or water needed to control combustion temperatures calculations were performed on a generic fuel composed of $CH_2$ units burning to form carbon dioxide and water. Group contribution methods yield a heat of combustion of approximately 45000 kJ/kg for this combustion. The combustion temperature is controlled at 1250 C. and cooling air or steam is introduced at 700 C. Over this temperature range and at a combustion pressure of 10 atmospheres, steam has an enthalpy of 1350 kJ/kg and air has an enthalpy of 620 kJ/kg. A heat balance yields the following fuel to inert ratio.

|  | Fuel (kg) | Inert (kg) | $CO_2$ (wt %) | Water (wt %) |
|---|---|---|---|---|
| Air | 1 | 72.6 | 4.3% | 1.75% |
| Steam | 1 | 33.3 | 9.2% | 90.8 |

As illustrated by this example, water in the flue gas can range from 2 to 90 wt % and oxygen depleted air can range from 0 to 94 %. The use of water alternative to nitrogen has advantages of reduced compression costs and reduced flue gas volumes.

Conclusion

While this invention has been described fully and completely with special emphasis upon several preferred embodiments, it should be understood that within the scope of the appended claims the invention may be practiced otherwise than as specifically described herein.

What is claimed is;

1. A high efficiency method using direct contact heat exchange for converting fuel into work, comprising the steps of:
    compressing oxygen containing gas,
    heating the said oxygen containing gas by direct contact of said oxygen containing gas with a heat exchange fluid containing less than 15 weight percent water and having a water-free partial vapor pressure of less than one atmosphere at 300 C.,
    contacting said oxygen containing gas with said heat exchange fluid in a heat exchange vessel to provide a heated gas having a temperature at least 150 C. greater than said oxygen containing gas,
    pumping said heat exchange fluid to a second heat exchange vessel,
    mixing said heated gas with a fuel in an expectative amount to sustain a combustion reaction to provide a fuel mixture,
    combusting said fuel mixture to provide a reaction product gas having a greater temperature than said heated gas,
    expanding said reaction product gas to provide shaft work and to provide a flue gas having less enthalpy than said reaction product gas,
    cooling said flue gas by directly contacting said flue gas with a heat exchange fluid in a second heat exchange vessel, and
    circulating said heat exchange fluid between said first heat exchange vessel and said second heat exchange vessel to increase the enthalpy of the said heat exchange fluid in said second vessel and to decrease the enthalpy of the said heat exchange fluid in the first heat exchange vessel.

2. A method according to 1 including the steps of:
    flowing the said heat exchange fluid down and over a surface provided by packing in the said first heat exchange vessel,
    flowing the said oxygen containing gas up and through the packing of the said first heat exchange vessel,
    flowing the said heat exchange fluid down and over a surface provided by packing in the said heat exchange vessel, and
    flowing the said flue gas up and through the packing of the said second heat exchange vessel.

3. A method according to 1 including the steps of:
    the said oxygen containing gas through an axial flow compressor and
    flowing the said reaction product gas through an axial flow turbine.

4. A method according to 1 including the steps of:
    evaporating a liquid in the first heat exchange vessel while in contact with the said oxygen containing gas.

5. A method according to 1 including the steps of:
    condensing water of the said flue gas and
    mixing of the resulting condensed water with the heat exchange fluid.

6. A high efficiency apparatus for converting fuel into work consisting of:
    a heat exchange fluid containing less than 15 weight percent water and having a water-free partial vapor pressure of less than one atmosphere at 300 C.,
    a compressor for compressing an influent oxygen containing gas,
    conduit connecting said compressor to a first direct contact heat exchange vessel,
    a first direct contact heat exchange vessel providing contact of said influent oxygen containing gas with said heat exchange fluid,
    conduit connecting said first direct contact heat exchange vessel to a mixing apparatus,
    a mixing apparatus which mixes said oxygen containing gas with fuel, a combustion apparatus operatively connected to said mixing apparatus which facilitates combustion and formation of reaction product gas, a expansion means operatively connected to said mixing apparatus which produces work during the expansion of said reaction product gas, conduit connecting said expansion means to a second direct contact heat exchange vessel, a second direct contact heat exchange vessel providing contact of said reaction product gas with said heat exchange fluid, and a circulating means which circulates said heat exchange fluid between said first direct contact heat exchange vessel and said second direct contact heat exchange vessel.

7. An apparatus according to claim 6 whereby said heat exchange fluid is one or a mixture of:
water, oil, molten salt, and molten metal.

8. An apparatus according to claim 7 whereby said heat exchange fluid is one or a mixture of:
potassium carbonate, sodium carbonate, lithium carbonate, and water.

* * * * *